UNITED STATES PATENT OFFICE.

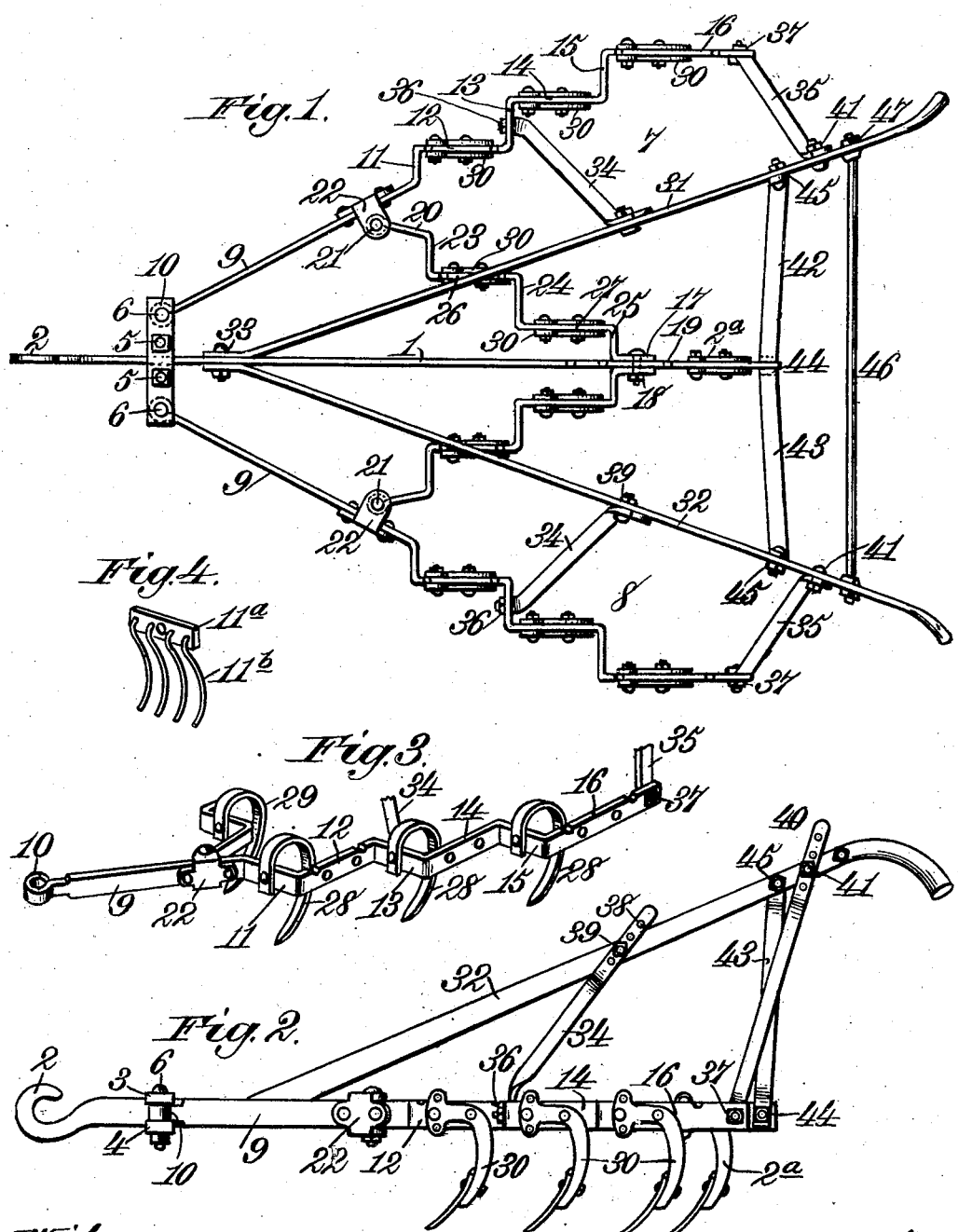

WILBUR C. OGLETREE, OF CARROLLTON, GEORGIA.

CULTIVATOR.

No. 845,660.　　　　Specification of Letters Patent.　　　　Patented Feb. 26, 1907.

Application filed November 10, 1906. Serial No. 342,838.

*To all whom it may concern:*

Be it known that I, WILBUR C. OGLETREE, a citizen of the United States, residing at Carrollton, in the county of Carroll and State of Georgia, have invented new and useful Improvements in Cultivators, of which the following is a specification.

This invention relates to cultivators particularly adapted for use in cultivating cotton; and the object thereof is to provide a cultivator in a manner, as hereinafter set forth, embodying in its construction two sections substantially V-shaped in contour and so disposed that when the cultivator is used the outer member of one section cultivates the outer side of a row of growing plants and the inner member of said section cultivates the inner side of the row of growing plants, while the other section of the cultivator plows the middle portion of the ground between the rows of growing plants.

A further object of the invention is to provide a cultivator embodying two substantially V-shaped sections having ground-working devices, each of said sections being adjustable, so as to increase the width thereof when occasion so requires.

Further objects of the invention are to provide a cultivator particularly adapted for cultivating cotton which shall be simple in its construction, strong, durable, efficient in its use, readily set up, and comparatively inexpensive to manufacture.

With the foregoing and other objects in view the invention consists of the novel construction, combination, and arrangement of parts, hereinafter more specifically described, and illustrated in the accompanying drawings, wherein is shown the preferred embodiment of a cultivator in accordance with this invention; but it is to be understood that changes, variations, and modifications can be resorted to which come within the scope of the claims hereunto appended.

In describing the invention in detail reference is had to the accompanying drawings, wherein like reference characters denote corresponding parts throughout the several views, and in which—

Figure 1 is a top plan view of a cultivator in accordance with this invention. Fig. 2 is a side elevation. Fig. 3 is a detail showing the arrangement of the spring harrow-teeth. Fig. 4 is a detail of the series of weeder-teeth, and Fig. 5 is a like view showing the adjustable supporting element for the plow-feet.

Referring to the drawings by reference characters, 1 denotes the central beam of a cultivator having its forward end formed in a hook-like manner, as at 2, for connecting a swingletree thereto, and at its rear end is provided with a cultivator-foot $2^a$. Secured to the forward portion of the beam 1 is a coupling element for connecting the outer side members of the cultivator-sections to the main beam 1. The coupling element consists of a pair of plates 3 4, each of which has its inner face grooved, so as to enable the plates 3 4 to straddle the beam 1. The plates 3 4 are connected together by holdfast devices 5 6 in the form of nuts and bolts, the holdfast device 5 being arranged in close proximity to the grooves in the plates 3 4 and the holdfast device 6 being arranged near the ends of the plates 3 4, and by the employment of the holdfast devices in a manner as shown the coupling element is fixedly secured to the main beam 1, near the forward end thereof.

The cultivator comprises two V-shaped sections, referred to generally by the reference characters 7 8. The section 7 is positioned at one side of the main beam 1 and the section 8 at the other side of the said main beam 1. As the section 7 is constructed in a similar manner as the section 8, but one section will be described, the same reference characters being applied thereto. Each of the V-shaped sections of the cultivator consists of an inner and an outer member. The outer member comprises an elongated inclined portion 9, having its forward end formed with a loop 10, through which extends the bolt 6 of the holdfast device, so that the said outer member will be hinged at its forward end to the coupling element carried by the main beam 1. The inclined portion 9 of the outer member terminates in an angularly-extending portion 11. The said portion 11 extends at right angles with respect to the main beam 1 and terminates in a rearwardly-extending portion 12, which is arranged in parallelism with respect to the main beam 1, and the said portion 12 terminates in an angularly-projecting portion 13, which extends at right angles with respect to the main beam 1, and the said portion 13 terminates in a rearwardly-extending portion 14, which is arranged in parallelism with respect to the main beam 1, and the portion 14 terminates in an angularly-projecting portion 15, which extends at right angles with respect to the main beam 1, and the said portion 15 terminates in a rearwardly-extending portion 16, which is arranged in parallelism with respect to the main beam 1. The inner member of the V-shaped section is interposed between the main beam 1 and the outer member of the section, and the said inner member comprises a forwardly-extending portion 17, which is arranged at the side of the main beam 1 and is adjustably connected to the said beam by the attaching device 18. Suitable holes 19 are provided in the main beam 1, so that the portion 17 can be secured at various points to the said beam, thereby enabling the said inner member to be adjusted to increase the width of the V-shaped section of the cultivator. To allow for this adjustment of the inner member, the latter is provided with an inclined forward portion 20, which is hinged, as at 21, to a coupling element 22, suitably carried by the portion 9 of the outer member. The inner member furthermore comprises a plurality of angularly-extending portions 23, 24, and 25, which extend in the same plane as the portions 11, 13, and 15 of the outer member, or, in other words, at right angles to the main beam 1, and the said inner member further comprises the forwardly-extending portions 26 27, the portion 26 being interposed between the portions 23 and 24, and the portion 27 is interposed between the portions 24 25. The portions 26 and 27 are arranged in parallelism with the portions 12 and 14 of the outer member and also in parallelism with the main beam 1. The angularly-extending portions 11 and 23 provide a straddling space near the apex of each V-shaped section, so that the outer member of the section can be positioned on one side of the row of growing plants and the inner member on the other side of said row. To each of the portions 11, 13, and 15 of the outer member a spring-harrow tooth 28 is attached, and to each of the portions 23, 24, and 25 of the inner member a spring harrow-tooth 29 is also attached when used as a harrow. To each of the portions 12, 14, and 16 of the outer member and the portions 26 and 27 of the inner member a cultivator or plow foot 30 is attached when used as a cultivator.

When used as a weeder, to the portions 11, 13, and 15 of the outer member and to the portions 23, 24, and 25 of the inner member weeder-teeth are secured, and in this connection it will be stated that a plate 11ª is provided, to which is secured a series of weeder-teeth 11ᵇ. The plate 11ª is formed with an opening through which extends a suitable holdfast device for securing a plate carrying a plurality of weeder-teeth to each of the portions 11, 13, and 15 of the outer member and 23, 24, and 25 of the inner member.

Oftentimes it is desirable to expand the cultivator and yet narrow the space between the straddling plows or to contract the cultivator and widen the space between the straddling plows, and for such purpose there is employed an adjustable supporting element for the plow-foot, the said element being adapted to be detachably secured in position so that it can be placed at the outer or the inner side of the outer or the inner member of the cultivator-section. There are as many supporting elements employed as there are portions of the outer and inner members, to each of which is adapted to be secured a plow-foot. The adjustable supporting member is shown in Fig. 5 and consists of a short bar 11ᶜ, to which is secured a plow-foot 11ᵈ. The bar 11ᶜ is detachably secured in position by means of a pair of yokes 11ᵉ, carrying holdfast devices on their lower ends, and between the holdfast devices and the lower edge of the member and the bar 11ᶜ is positioned the clamping-pieces 11ᶠ. Upon the top of each of the yokes 11ᵉ and interposed between the bar 11ᶜ and the member is a spacing-washer 11ᵍ. In Fig. 5 the supporting element for the plow-foot is positioned at the outer side of one of the members of a section; but owing to the manner in which the supporting element is detachably connected to said member it will be evident that the plow-foot can be positioned upon the inner side of the member. If it be desired to widen the straddling space the plow-feet are removed from the inner and outer members of a section and connected to supporting elements formed by the bars 11ᶜ. The bars 11ᶜ, with the plow-feet, are then secured at the outer side of the outer and inner members. If it be desired to narrow the straddling space, the bars 11ᶜ, with the plow-feet, are secured upon the inner side of the outer and inner members of the cultivator-section.

By securing the harrow or weeder teeth and the plow-feet to the outer and inner members of the section the said teeth and feet will be arranged in substantially a V-shaped manner, as will be evident.

The reference characters 31 and 32 denote the handles of the cultivator, and at their forward ends they are secured to the sides of the main beam 1, as at 33, near the coupling element upon the beam. These handles extend rearwardly and upwardly at an inclination and are so disposed that they will extend over each of the V-shaped sections of the cultivator. Each of the handles has the outer member of a V-shaped section of the cultivator adjustably connected thereto, and the said connection consists of a pair of brace members 34 35. The brace 34 at one end is fixedly connected, as at 36, to the portion 13 of the outer member, and the brace 35 is fixedly connected, as at 37, to the rear end of the portion 16 of the outer member. The brace 34 at its other end is provided with a plurality of openings 38, so that it can be adjustably connected to the handle, as at 39, and the brace 35 is also provided with a plurality of openings 40, so that it can be adjustably connected to the handle, as at 41. A pair of brace members for the handles is indicated by the reference characters 42 43. These braces are secured at one end, as at 44, to the rear end of the beam and at the other end to the handles, as at 45. An additional brace member is further provided for the handles and which is indicated by the reference character 46. This brace is secured at its ends to the handles, as at 47.

It will be evident that when the cultivator is used the outer member of one section will cultivate one side of the row of growing plants and the inner member of the said section will cultivate the opposite side of the growing plants, while the other section of the cultivator will plow centrally or cultivate centrally the earth between the rows of growing plants, and consequently the two sections of the cultivator when said cultivator is used will till the earth at each side of the row of plants and centrally between the rows.

As an example of the manner in which the cultivator operates it will be assumed that it is desired to cultivate a field of growing plants with the rows running east and west, the rows being of the ordinary width. Beginning at the northeast corner of the field the cultivator is positioned to straddle a row of plants. Consequently the teeth upon the outer member of the section 8 are disposed on the south side of the row and the teeth upon the inner member of the section 8 and the inner and outer members of the section 7 are disposed on the north side of the row, the animal and the tiller walking at the north of the row. Driving to the west end of the row the cultivator will have plowed a strip on the south side of the row and a strip approximately three times as wide on the north side of the row. The cultivator is then turned around and faces east, and the next row of plants is then straddled. This disposes the teeth upon the outer member of the section 7 south of the row and the teeth carried by the inner member of the section 7 and the inner and outer members of the section 8 on the north side of the row, the animal and tiller walking to the north of the row, then driving to the east, and consequently the cultivator will have plowed a strip on the south of the row and a strip approximately three times as wide on the north side of the row.

What I claim is—

1. A cultivator comprising a main beam and a pair of substantially V-shaped sections provided with ground-working devices, there being a V-shaped section disposed at each side of the beam and each of said V-shaped sections provided at the forward end thereof with a straddling space.

2. A cultivator comprising a main beam and a pair of substantially V-shaped sections provided with ground-working devices there being a V-shaped section disposed at each side of the beam, and with the apex of the section arranged near the front of the cultivator and means for adjusting the width of each of said V-shaped sections.

3. A cultivator comprising a main beam, a pair of outer members one disposed at each side of the main beam and hinged at its forward end to the main beam, a pair of inner members, one disposed at each side of the main beam and hinged to an outer member forwardly thereof, said outer and inner members provided near their point of connection between each other with angularly-disposed portions to form a straddling space, means for adjustably connecting the inner members to the main beam, a pair of handles connected to the main beam, means for adjustably connecting the outer members to the handles, and ground-working devices carried by the inner and outer members.

4. A cultivator comprising a main beam having a ground-working device at its rear end, a pair of outer members, one disposed at each side of the beam and each of said members formed with portions disposed at right angles with respect to the beam and portions extending in parallelism with respect to the beam, means for hinging the forward ends of said members to the beam, an inner member interposed between each outer member and the beam, each of said inner members provided with portions extending at right angles with respect to the beam and portions extending in parallelism with respect to the beam, means for hinging one end of the inner members to the outer members, means for adjustably connecting the other ends of said outer members to the beam, a pair of handles attached to the beam, adjustable connections between the handles and the said outer members, and ground-working devices carried by the portions of the said members which extend in parallelism with respect to the beam.

5. A cultivator comprising a main beam having a ground-working device at its rear end, a pair of outer members, one disposed at each side of the beam and each of said members formed with portions disposed at right angles with respect to the beam and portions extending in parallelism with respect to the beam, means for hinging the forward ends of said members to the beam, an inner member interposed between each outer member and the beam, each of said inner members provided with portions extending at right angles with respect to the beam and portions extending in parallelism with respect to the beam, means for hinging one end of the inner members to the outer members, means for adjustably connecting the other ends of said outer members to the beam, a pair of handles attached to the beam, adjustable connections between the handles and the said outer members, ground-working devices carried by the portions of the said members which extend in parallelism with respect to the beam, and ground-working devices carried by certain of the said angularly-disposed portions of the said members.

6. A cultivator comprising a main beam having a ground-working device at its rear end, a pair of outer members, one disposed at each side of the beam and each of said members formed with portions disposed at right angles with respect to the beam and portions extending in parallelism with respect to the beam, means for connecting the forward ends of said members to the beam, an inner member interposed between each outer member and the beam, each of said inner members provided with portions extending at right angles with respect to the beam and portions extending in parallelism with respect to the beam, means for connecting one end of the inner members to the outer members, means for connecting the other ends of said outer members to the beam, a pair of handles attached to the beam, connections between the handles and the said outer members, ground-working devices carried by the portions of the said members which extend in parallelism with respect to the beam.

7. A cultivator comprising a main beam having a ground-working device at its rear end, a pair of outer members, one disposed at each side of the beam and each of said members formed with portions disposed at right angles with respect to the beam and portions extending in parallelism with respect to the beam, means for connecting the forward ends of said members to the beam, an inner member interposed between each outer member and the beam, each of said inner members provided with portions extending at right angles with respect to the beam and portions extending in parallelism with respect to the beam, means for connecting one end of the inner members to the outer members, means for connecting the other ends of said outer members to the beam, a pair of handles attached to the beam, connections between the handles and the said outer members, ground-working devices carried by the portions of the said members which extend in parallelism with respect to the beam, and ground-working devices carried by certain of the said angularly-disposed portions of the said members.

8. A cultivator comprising a main beam centrally disposed and a pair of substantially V-shaped sections, there being a V-shaped section disposed at each side of said beam, each of said V-shaped sections consisting of an outer and an inner member, the outer member being hinged to near the forward end of said main beam, means for adjustably connecting the rear end of the inner member to the beam, means for connecting the forward end of the inner member to an outer member at a point removed from the forward end of said outer member thereby forming the apex of the V-shaped section, each of said inner and outer members being provided with means to form a straddling space near the apex of the section whereby the outer member may be positioned upon one side of a row of growing plants and the inner member on the other side of said row.

9. A cultivator comprising a main beam carrying ground-working devices at the rear thereof, a pair of outer members hinged to the forward portion of said means, each of said outer members at a point removed from its forward end provided with portions extending at right angles to the main beam and portions extending in parallelism with respect to the main beam, a pair of inner members interposed between the outer members and the main beam, each of said inner members being hinged at its forward end to an outer member thereby in connection with the outer member forming a V-shaped section, each of said inner members having portions extending at right angles to the main beam and portions extending in parallelism with respect to the main beam, certain of the angularly-disposed portions of the said inner and outer members forming a straddling space near the apex of the sections, means for adjustably connecting the rear ends of said inner members to the main beam to allow the increasing and decreasing of the width of the V-shaped sections, a pair of handles attached at their forward ends to the main beam and adjustably connected at their rear ends to the main beam, means for connecting the handles to the rear ends of the outer members, ground-working devices carried by the right-angularly-extending portions of the inner and outer members, and ground-working devices carried by those portions of the inner and outer members which extend in parallelism with the main beam.

In testimony whereof I have hereunto set my hand in presence of two subscribing witnesses.

W. C. OGLETREE.

Witnesses:
W. J. PERDUE,
U. W. JORDAN.